United States Patent
Park et al.

(10) Patent No.: US 8,963,994 B2
(45) Date of Patent: Feb. 24, 2015

(54) APPARATUS AND METHOD FOR TRANSMITTING STEREOSCOPIC IMAGE DATA

(75) Inventors: Tae-Sung Park, Suwon-si (KR); Jong-Ho Kim, Suwon-si (KR); Yun-Je Oh, Suwon-si (KR); Doug-Young Suh, Seongnam-si (KR); Gwang-Hoon Park, Seongnam-si (KR); Kyu-Heon Kim, Seoul (KR); Chun-Bae Park, Jeollabuk-do (KR)

(73) Assignees: Samsung Electronics Co., Ltd., Suwon-si (KR); University-Industry Cooperation Group of Kyung Hee University, Yongin-si (KR)

( * ) Notice: Subject to any disclaimer, the term of this patent is extended or adjusted under 35 U.S.C. 154(b) by 806 days.

(21) Appl. No.: 12/759,126

(22) Filed: Apr. 13, 2010

(65) Prior Publication Data
US 2010/0259596 A1    Oct. 14, 2010

(30) Foreign Application Priority Data

Apr. 13, 2009   (KR) .................. 10-2009-0031850

(51) Int. Cl.
*H04N 19/597*   (2014.01)
(52) U.S. Cl.
CPC .................. *H04N 19/00769* (2013.01)
USPC .......................................................... 348/43
(58) Field of Classification Search
CPC ................................................... H04N 19/769
USPC ...................... 348/42–60; 375/240
See application file for complete search history.

(56) References Cited

U.S. PATENT DOCUMENTS

| | | | | |
|---|---|---|---|---|
| 5,619,256 | A * | 4/1997 | Haskell et al. | 348/43 |
| 6,055,274 | A * | 4/2000 | McVeigh | 375/240.16 |
| 7,450,646 | B2 * | 11/2008 | Kurauchi | 375/240.26 |
| 7,903,737 | B2 * | 3/2011 | Martinian et al. | 375/240.12 |
| 8,150,174 | B2 * | 4/2012 | Moon et al. | 382/232 |
| 2003/0223494 | A1 | 12/2003 | Kurauchi | |
| 2005/0062846 | A1 * | 3/2005 | Choi et al. | 348/42 |
| 2006/0195752 | A1 | 8/2006 | Walker et al. | |
| 2009/0103635 | A1 * | 4/2009 | Pahalawatta | 375/240.27 |
| 2009/0232202 | A1 * | 9/2009 | Chen et al. | 375/240.02 |

FOREIGN PATENT DOCUMENTS

CN   101073268 A   11/2007
CN   101107804 A   1/2008

OTHER PUBLICATIONS

Communication, dated Nov. 1, 2013, issued by the State Intellectual Property Office of the Peoples' Republic of China: in corresponding Application No. 201010223981.8.

* cited by examiner

*Primary Examiner* — William C Vaughn, Jr.
*Assistant Examiner* — Naod Belai
(74) *Attorney, Agent, or Firm* — Sughrue Mion, PLLC

(57) ABSTRACT

A method and apparatus transmitting stereoscopic image data according to a variable channel environment are provided. The method includes granting a priority to each of a plurality of frames constituting one image group; determining a number of transmittable frames based on a variable channel environment; and selecting transmittable frames from among the plurality of frames based on the determined number of transmittable frames and the granted priorities.

30 Claims, 15 Drawing Sheets

APPARATUS AND METHOD FOR TRANSMITTING STEREOSCOPIC IMAGE DATA

PRIORITY

This application claims priority from Korean Patent Application No. 10-2009-0031850 filed Apr. 13, 2009 in the Korean Intellectual Property Office, the entire disclosure of which is hereby incorporated by reference.

BACKGROUND

1. Field

Apparatuses and methods consistent with exemplary embodiments relate generally to stereoscopic images, and more particularly, to for transmitting stereoscopic image data based on priority.

2. Description of the Related Art

Generally, a stereoscopic image refers to a pair of images consisting of left and right images acquired by taking a picture of one subject. Therefore, the stereoscopic image includes two video sequences that correspond to the left and right images, respectively.

A transmitter encodes and transmits stereoscopic images, and a receiver receives and decodes the encoded stereoscopic images. The service quality obtainable in the receiver may be determined according to the technique of encoding and transmitting stereoscopic images at the transmitter, including streaming encoded stereoscopic image files.

The channel environment between the transmitter and the receiver may change from time to time depending on the communication environment. Therefore, in order to improve service quality in the receiver, the transmitter needs to perform optimal encoding and transmission on stereoscopic images taking into consideration the variable channel environment.

SUMMARY

Exemplary embodiments provide an apparatus and method for adaptively transmitting stereoscopic image data for improvement of a service quality in a variable channel environment.

Exemplary embodiments also provide an apparatus and method for granting priorities to frames constituting stereoscopic image data based on a reference relationship between the frames, and transmitting the stereoscopic image data according to the granted priorities.

Exemplary embodiments also provide a stereoscopic image data transmission apparatus and method for selecting frames to be transmitted from frames constituting the stereoscopic image data taking into account priorities granted to the frames and a variable channel environment.

Exemplary embodiments also provide a stereoscopic image data transmission apparatus and method for selecting optimal frames transmittable in the current channel environment from frames constituting the stereoscopic image data based on priorities granted to the frames.

In accordance with an aspect of an exemplary embodiment, there is provided a method for transmitting stereoscopic image data, the method including granting a priority is granted to each of a plurality of frames constituting one image group, determining a number of transmittable frames based on a channel environment, and selecting transmittable frames from the plurality of frames based on the determined number of transmittable frames and the granted priorities.

In accordance with an aspect of another exemplary embodiment, there is provided an apparatus for transmitting stereoscopic image data, the apparatus including a channel monitor which monitors a channel environment, and an extractor which grants a priority to each of a plurality of frames constituting one image group, determines a number of transmittable frames based on the channel environment monitored by the channel monitor, selects transmittable frames from among the plurality of frames based on the determined number of transmittable frames and the granted priorities.

BRIEF DESCRIPTION OF THE DRAWINGS

The above and/or other aspects of certain exemplary embodiments will be more apparent from the following description taken in conjunction with the accompanying drawings, in which.

Throughout the drawings, the same drawing reference numerals will be understood to refer to the same elements, features and structures.

DETAILED DESCRIPTION OF EXEMPLARY EMBODIMENTS

Exemplary embodiments will now be described in detail with reference to the accompanying drawings. In the following description, a detailed description of known functions and configurations incorporated herein has been omitted for clarity and conciseness. Terms used herein are defined based on functions in the exemplary embodiments and may vary according to users, operators' intention or usual practices. Therefore, the definition of the terms should be made based on contents throughout the specification.

Generally, a method of encoding and decoding stereoscopic images may include a method of encoding and decoding in a single video sequence, and a method of encoding and decoding in multiple video sequences. The method of encoding and decoding in a single video sequence is divided into a method using one single-view codec and a method using a multi-view codec. The method of encoding and decoding in multiple video sequences includes only a method using multiple single-view codecs.

A typical example of the method of encoding and decoding in a single video sequence includes a method of creating one composite image using a left image and a right image and then encoding and decoding the composite image using a single-view video codec such as a H.264/Advanced Video Codec (AVC).

For the above method, a transmitter needs to create one video sequence by encoding video sequences corresponding to left and right images, and a receiver needs to separate video sequences corresponding to left and right images from the one video sequence.

The method of creating one composite image using left and right images includes a method of alternately arranging pixels line by line in each of the left and right images.

Figure 1:
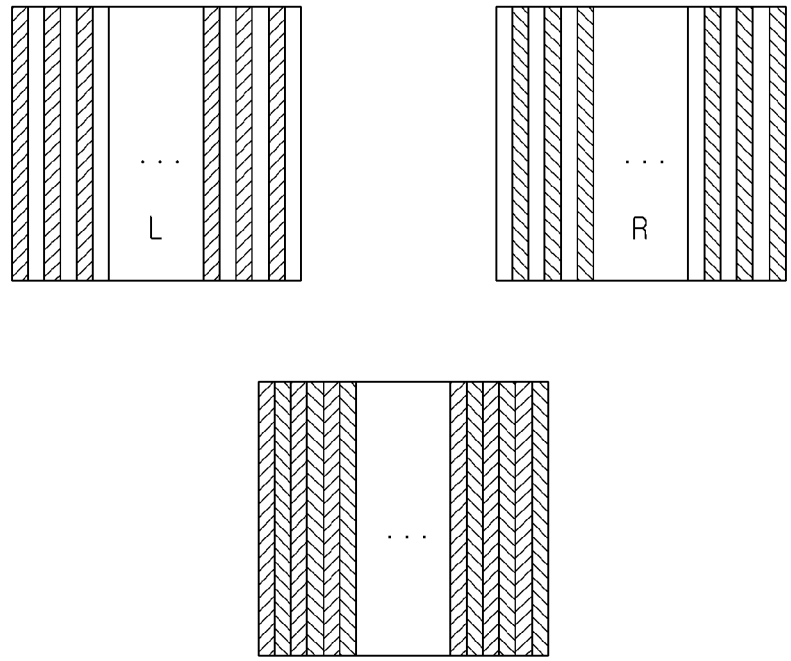
FIG. 1 is a diagram showing an example of a general method for creating a composite image using left and right images.

For example, as shown in FIG. 1, one composite image may be created using odd-numbered vertical lines of a left image and even-numbered vertical lines of a right image. Alternatively, even-numbered vertical lines of the left image and odd-numbered vertical lines of the right image may be used, and horizontal lines may be used instead of vertical lines.

When a composite image has been created as described above, the receiver extracts odd-numbered vertical lines of the left image and even-numbered vertical lines of the right image from the composite image. Then, the receiver creates even-numbered vertical lines of the left image and odd-numbered vertical lines of the right image by utilizing an interpolation technique that uses the extracted odd-numbered vertical lines of the left image and the extracted even-numbered vertical lines of the right image.

Figure 2:
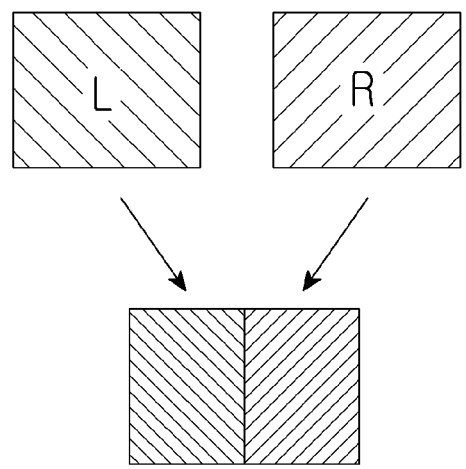
FIG. 2 is a diagram showing another example of a general method for creating a composite image using left and right images.

As another method of creating the composite image, a composite image may be created by down-sampling a left image and a right image as shown in FIG. 2. It is shown in FIG. 2 that horizontal sizes of left and right images are halved by down-sampling and the down-sampled left and right images are merged into a single image.

In contrast, the composite image may be created by down-sampling the left and right images in the vertical direction, but not in the horizontal direction. To increase a correlation at the point where the left and right images are merged, a method of reversing one of the left and right images before the down-sampling may be added.

When a composite image has been created as stated above, the receiver extracts left and right images down-sized in the horizontal or vertical direction from the composite image, and creates the left and right images of the original size by up-sampling the extracted left and right images.

Next, in the case of a multi-view image that undergoes encoding and decoding in multiple video sequences, one situation is taken from different angles. Therefore, there is a high correlation between the captured images.

A Multi-view Video Codec (MVC) has been developed as a codec that simultaneously encodes and decodes the multi-view image using a correlation between images existing at the same time in addition to a correlation in the time axis.

Figure 3:
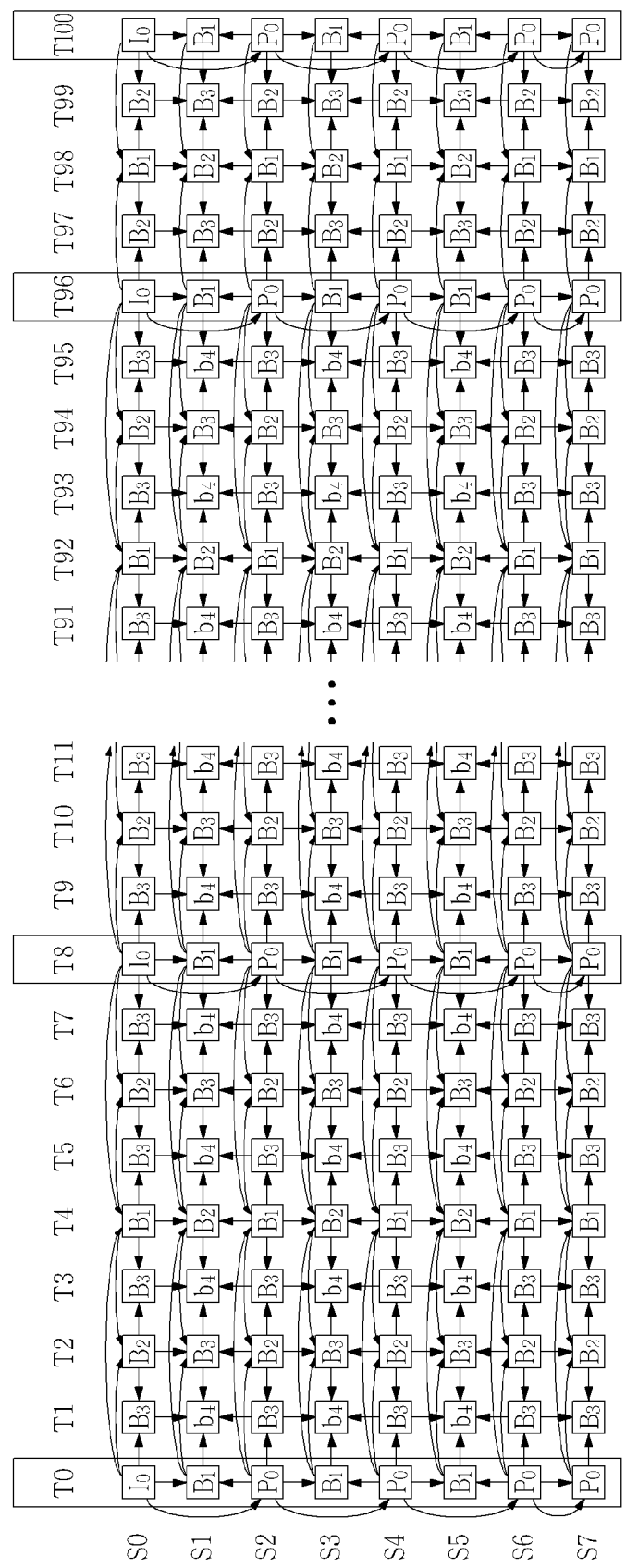
FIG. 3 is a diagram showing a view-time prediction structure using a hierarchical B-picture according to the related art.

FIG. 3 shows a view-time prediction structure using a hierarchical B-picture in the MVC, in which a stereoscopic image includes left and right images having different views.

Another method of encoding and decoding a multi-view image includes a method of using two single-view codecs.

In order to encode and decode stereoscopic images including left and right images, the above method uses two single-view codecs that can encode and decode only one view at a time. Hence, a correlation between the left and right images cannot be used since the left and right images are encoded and decoded independently.

The single or multiple video sequences encoded in any one of the above methods may be transmitted to a display device. A service quality of the stereoscopic video may vary depending on the channel environment.

Therefore, there is a need for a method of transmitting stereoscopic image data taking the variable channel environment into consideration. In addition, when stereoscopic images are encoded for transmission, a playback method for the stereoscopic images should also be considered for improvement of the service quality.

The exemplary embodiments provide a method for adaptively transmitting stereoscopic image data according to the variable channel environment to improve the service quality depending on a playback method for the stereoscopic images. To this end, if a monitored channel environment becomes worse than a predetermined reference, a transmitter selects stereoscopic image data to be transmitted, according to the priorities.

A method of determining the priorities depends on the playback method for stereoscopic images, and parities are added to data in different ways according to the determined priorities during transmission. Then, a receiver separates a received image into left and right images by decoding it and plays them, using the codec used in the transmitter.

By doing so, it is possible to adaptively cope with a loss by the transmission environment, and the receiver can provide seamless real-time services.

Generally, in a service that is encoded in real time during transmission, if information indicating a drop of an available bit rate in the channel is received, the bit rate can be adaptively adjusted by degrading the video quality. However, in a service transmitting the already encoded video, like the streaming service, the bit rate may be adjusted by prioritizing packets, filtering them in order of lower priority, and avoiding transmitting the packets with lower priority.

Generally, in the case of multimedia data, voice or audio data has higher priority than video data, and even the video data may be prioritized packet by packet. The priority of each packet may be determined depending on Data Separation or Network Abstraction Layer (NAL) header of H.246/AVC.

Exemplary embodiments will now be described in detail with reference to the accompanying drawings. Throughout the drawings, the same drawing reference numerals will be understood to refer to the same elements, features and structures.

Figure 4:
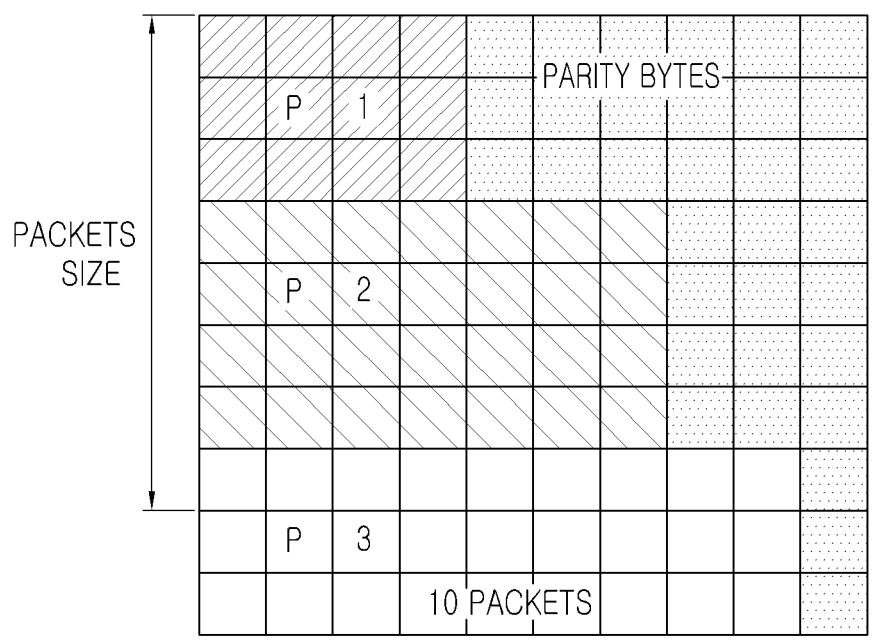
FIG. 4 is a diagram showing a priority-based differentiated loss recovery method in which important data is placed in front of a packet.

FIG. 4 shows how to differentiate packet losses based on the priorities of data using Reed-Solomon codes.

As shown in FIG. 4, data is placed in priority groups P1, P2 and P3 according to the priority (where a priority of P1>a priority of P2>a priority of P3), and a number of parity packets for each of the priority groups P1, P2 and P3 is calculated. The number of parity packets is calculated horizontally in accordance with the Reed-Solomon code method. As in FIG. 4, the priority groups P1, P2 and P3 are RS[10,4], RS[10,7] and RS[10,9], respectively, and these are encoded by attaching more parity packets to the priority groups including important packets.

As a result, if 10 packets are transmitted column by column, packet recovery is possible even though 6, 3 and 1 packet(s) out of the 10 packets are lost in the priority groups P1, P2 and P3, respectively. This method is applicable when data with different priorities exists within one packet, but it is inapplicable when each packet has different priority.

Figure 23:
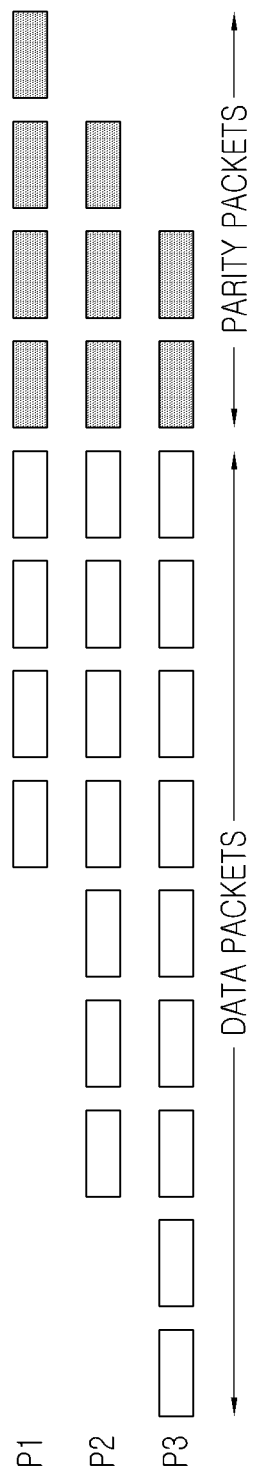
FIG. 23 is a diagram showing an example of adding parity packets to data packets according to an exemplary embodiment.

Unlike the above, if packets are created for each priority independently, the number of parity packets may be different according to the priority, for packet protection. For example, if priority groups P1, P2 and P3 have 4, 7 and 9 data packets, respectively, as shown in FIG. 23, then 4, 3 and 2 parity packets are created for them for transmission. In this method, in the case of P1, even if up to any 4 packets are lost among the total of 8 packets, the 4 data packets may be recovered.

Figure 5:
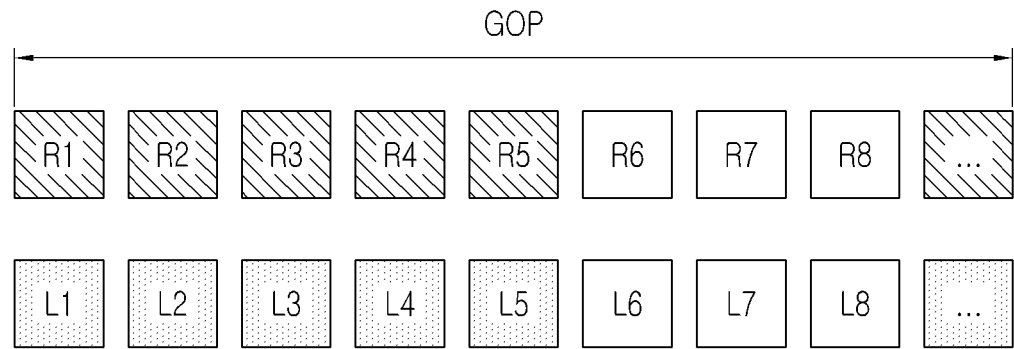
FIG. 5 is a diagram showing a method for playing only stereoscopic images.

FIG. 5 shows a playback method in an apparatus capable of playing only stereoscopic images.

According to the playback method shown in FIG. 5, $1^{st}$ to $5^{th}$ parts where left and right images have been simultaneously transmitted are played simultaneously, if the transmission bandwidth is insufficient due to the poor channel environment. The succeeding images may be played by referencing (referring to) their preceding images. In other words, a playback screen of $5^{th}$ left and right images R5 and L5 may be continuously displayed, if $6^{th}$ to $8^{th}$ left and right images R6-R8 and L6-L8 have not been transmitted.

Figure 6:
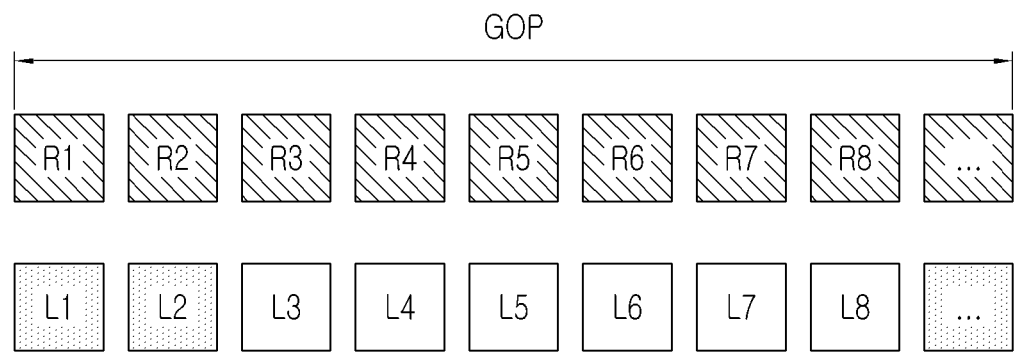
FIG. 6 is a diagram showing a method for playing stereoscopic images and monoscopic images.

In an apparatus capable of playing both stereoscopic images and monoscopic images, as shown in FIG. 6, images are played in stereoscopic images in $1^{st}$ and $2^{nd}$ parts where left and right images have been simultaneously transmitted, and played in monoscopic images in a $3^{rd}$ part and its succeeding parts where only left or right images have been transmitted.

As described above, stereoscopic images consist of two-view images of left and right views, and a codec of encoding and decoding one view may be used to encode and decode the two-view images. However, a codec of encoding and decoding multiple views at a time may also be used.

A playback method may include a method of playing only stereoscopic images and a method of playing both of stereoscopic images and monoscopic images. It is possible to cope with a loss by adding different numbers of parity packets according to the priority as shown in FIG. 4. However, for use of the method defied in FIG. 4, it is necessary to gather data having the same priorities.

In the case of real-time services, if the bandwidth is insufficient, the data to be transmitted should be discarded, or transmitted by buffering. However, for the real-time services, providing seamless services despite a decrease in the quality is preferable compared with the buffering-based transmission that undergoes a delay. Therefore, in this case, it is preferable to discard the low-priority data during transmission.

To this end, it is necessary that a transmitter selects only some of the entire data and transmits the selected data, and a receiver achieves a seamless service using the some data despite a decrease of the quality. If data is discarded during the data selection, no delay occurs, but data with high priority may be discarded. If the same amount of data is discarded, discarding high-priority data will affect the service quality more, compared with discarding low-priority data. Therefore, basically, selecting some data should be achieved according to the priority as long as the bandwidth condition is satisfied.

Especially, in the case of stereoscopic images, the service quality depends on the playback method. Hence, a method of granting priorities of data should be changed according to the playback method.

Accordingly, a method of selecting transmission data by granting different priorities to data according to the playback method is required in the situation where some data is discarded to avoid the service delay.

Figure 7:
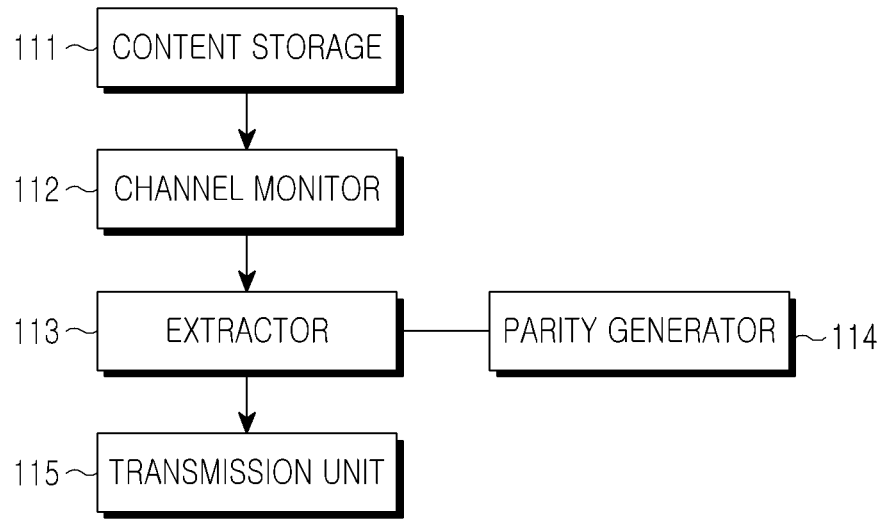
FIG. 7 is a diagram showing a structure of a transmitter for stereoscopic images according to an exemplary embodiment.

FIG. 7 shows an example of a stereoscopic image transmission apparatus for granting different priorities considering a playback method and transmitting data selected based on the priorities, according to an exemplary embodiment.

Referring to FIG. 7, a content storage 111 provides encoded contents, which means retrieving bitstreams that have been stored in a mass storage device such as a hard disk drive (HDD), or are encoded in real time.

A channel monitor 112 monitors the status of the transmission channel. By the monitoring, it is possible to obtain channel status information, such as available bandwidth and loss rate.

An extractor 113 grants priorities to data according to the codec used for encoding/decoding and the playback method, based on the monitoring results by the channel monitor 112. The extractor 113 selects transmission data from the entire data considering the priorities granted to the entire data. In particular, the extractor 113 determines the number of frames referencing other frames, or the number of references made among frames in an encoded bitstream structure. Based on the determined number of referencing frames, the extractor 113 forms Groups of Pictures (GOPs) with frames having the same number of referencing frames, and determines priority groups on a GOP basis in order of the larger number of referencing frames. The transmission data is selected by determining the priority groups. That is, the extractor 113 selects the transmission data determined based on the monitoring results by the channel monitor 112, from among the priority groups.

A parity generator 114 adds parity packets to the selected data in different ways according to the priorities. The differentiated addition of parity packets may be adapted to a transmission loss. For this purpose, the parity generator 114 may first determine the number of parity packets to be added for each of the priorities, and then store the results in advance.

A transmission unit 115 adds the parity packets generated by the parity generator 114 to the selected bitstream-type data, and transmits the data.

Accordingly, when the channel conditions change in the wireless channels, the above-described structure can adaptively transmit stereoscopic image data considering the measured available bit rate and packet loss rate, attributing to improvement of the service quality.

Figure 8:
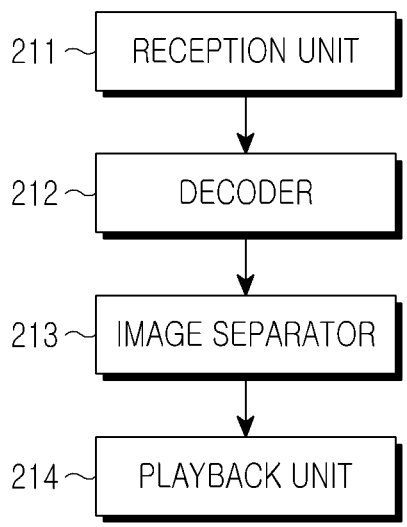
FIG. 8 is a diagram showing a structure of a receiver for stereoscopic images according to an exemplary embodiment.

FIG. 8 shows a structure of a stereoscopic image reception apparatus according to an exemplary embodiment.

Referring to FIG. 8, a reception unit 211 receives an encoded stereoscopic bitstream through a transmission channel and provides it to a decoder 212. The decoder 212 decodes the received encoded bitstream. An image separator 213 separates the decoded images into left and right images. The left and right images may be separated upon completion of the decoding by the used codec. However, in a method using one single-view codec, it is necessary to separate the decoded images into left and right images through an image separation process in the image separator 213. A playback unit 214, which is a display device for stereoscopic images, plays the left and right images provided from the decoder 212 or the image separator 213.

As discussed above, there are provided different exemplary embodiments in which one single-view codec is used, a multi-view codec is used, and two single-view codecs are used. In these exemplary embodiments, the one single-view codec and the multi-view codec are used to perform encoding and decoding in a single video sequence, and the two single-view codecs are used to encode and decode images in multiple video sequences.

A process of granting bit rate adaptation and a process of granting robustness against the loss in each of the different exemplary embodiments is described below.

A description will be made of a bit rate adaptation granting process and a process of granting robustness against the loss according to an exemplary embodiment, in which one single-view codec is used for encoding.

Figure 9:
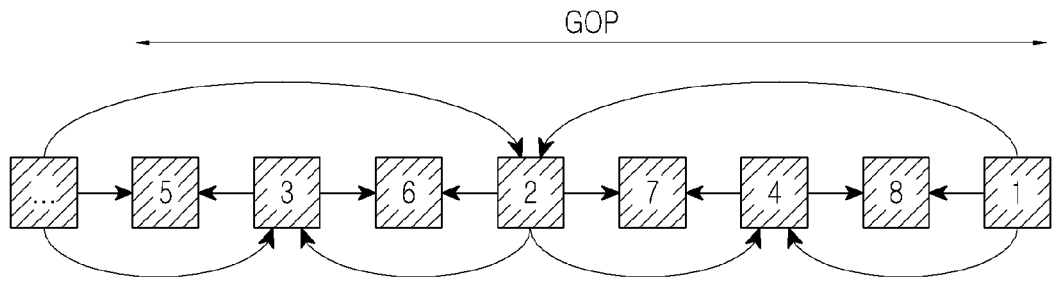
FIG. 9 is a diagram showing an example of a reference relationship when one single-view codec is used, according to an exemplary embodiment.

FIG. 9 shows an example of a reference relationship when one single-view codec is used, and especially shows a reference relationship when the bitstream has a structure of B, B, B, B, B, B, B, I frames. The reference relationship shown in FIG. 9 is given on the assumption that one composite image is made of left and right images, and encoded in units of GOP data using one single-view codec.

Referring to FIG. 9, a bi-prediction image B (frame #2) is predicted from intra-images I on both sides. Namely, the rightmost intra-image I (frame #1) is referenced to predict the bi-prediction image B (frame #2). In this way, the frame #2 is referenced to predict a frame #3 and a frame #4, and the frame #3 is referenced to predict frames #5 and #6. Therefore, if the frame #2 is lost, it is not possible to recover a total of seven frames #3, #4, #5, #6, #7 and #8, including the frame #2. Similarly, if the frame #3 is lost, three frames #3, #5 and #6 cannot be recovered.

The bitstream is created by encoding GOP data based on such reference relationship. Numbers in each frame indicate the order of frames in the bitstream, i.e., indicate the encoded order, and regarding the actual playback order, frames are played in order of left to right.

Figure 10:
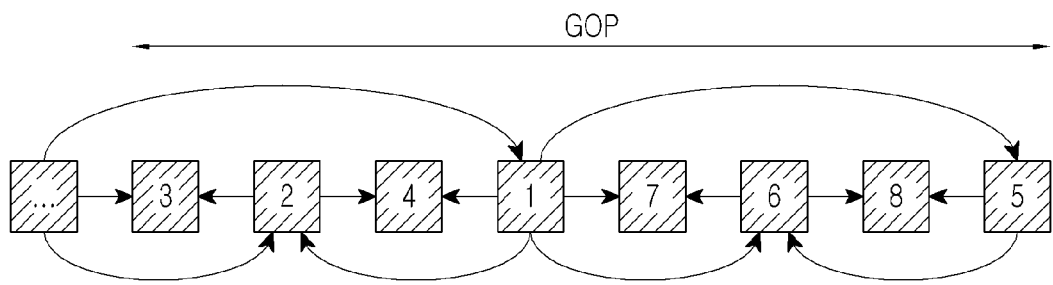
FIG. 10 is a diagram showing another example of a reference relationship when one single-view codec is used, according to an exemplary embodiment.

FIG. 10 shows another example of a reference relationship when one single-view codec is used, and especially shows a reference relationship when the bitstream has a structure of B, B, B, P, B, B, B, P frames. In FIG. 10, numbers in each frame indicate the order of frames in the bitstream as in FIG. 9, and regarding even the actual playback order, frames are played in order of left to right.

It is noted from FIGS. 9 and 10 that the order of frames in the bitstream varies according to the reference relationship between the frames. Therefore, the priorities cannot be determined according to the order of frames existing in the bitstream.

Accordingly, the exemplary embodiment determines the priorities based on the number of frames referencing the pertinent frame. In particular, the number of referencing frames is determined by determining the encoding structure, and the priorities are determined according to the determined number of referencing frames.

Thereafter, transmission data is selected in order of high-priority frame according to the transmission bandwidth. For example, in FIG. 9, seven frames #2, #3, #4, #5, #6, #7 and #8 located on the left side of the frame #1 reference the frame #1 directly or indirectly. Although not illustrated, the frame #1 is referenced directly or indirectly by the same number of frames among the frames located on the right side of the frame #1. Accordingly, since the total number of frames referencing the frame #1 is 14, 14 frames are affected by the frame #1.

The frame #2 is referenced by six frames #3, #4, #5, #6, #7 and #8 directly or indirectly. The frame #3 is referenced by the frames #5 and #6 directly or indirectly. The frame #4 is referenced by the frames #7 and #8 directly or indirectly.

Therefore, priority groups are formed in order of (1, 2), (3, 4), (5, 6, 7, 8). If the frame #1 referenced by 14 frames and the frame #2 referenced by 6 frames are categorized in the same priority group, the frame #1 can be granted a priority that is one level higher. It is noted from this example that the frame #1 is an intra-frame that does not reference other frames.

In the same manner, in FIG. 10, priority groups may be determined in order of (1, 5), (2, 6), (3, 4, 7, 8). The reason why only some data instead of the entire GOP data can be selected and transmitted is because of the above-mentioned reference relationships.

The bitstream selected to be transmitted is composed of higher-priority data. If a data loss occurs during transmission, since the loss of high-priority data significantly decreases the service quality compared with the loss of low-priority data, a method capable of transmitting high-priority data more safely is required. Thus, Unequal Error Protection (UEP) is used to transmit the selected bitstream at the optimal data rate with the limited bandwidth and under the given channel environment.

Because one encoded frame includes both the left and right images as one composite image, its playback is achieved by the playback method shown in FIG. 5, which is a method of simultaneously playing the left and right images.

If each image frame is encoded in multiple slices and the left and right images are distinguished by the slices, the mixed mono-stereo transmission may be possible. In this case, it is also possible to consider transmitting only the important parts on the screen in a stereoscopic manner and transmitting the other parts in a monoscopic manner. In the case of, for example, news casting, image data associated with announcers may be processed in a stereoscopic way, while image data associated with the backgrounds may be processed in a monoscopic way.

When one single-view codec is used by synthesizing left and right images as shown in FIG. 1, the priority granting method is not changed depending on the left/right because the left and right images are both transmitted in a mixed way. That is, the priority groups may be determined according to the number of referencing frames in the above-described method. The data having the same priorities should be gathered first, in order to more reliably transmit the high-priority data. Thereafter, it is possible to prepare for loss by adding different numbers of parity packets according to the priorities of the gathered data.

In the image synthesis shown in FIG. 2, even if one single-view codec is used for encoding, independent packets may be transmitted by encoding the left and right images in independent slices. In this case, the priorities of the left and right images may be different as shown in FIGS. 5 and 6.

Figure 11:
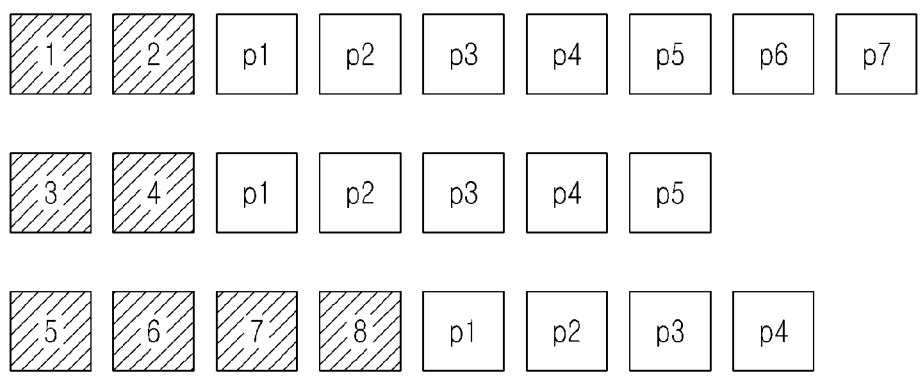
FIG. 11 is a diagram showing differentiated parity generation based on priority groups according to an exemplary embodiment.

FIG. 11 shows an example of generating parity packets in different ways for each of priority groups according to an exemplary embodiment.

In FIG. 11, priority groups in order of (1, 2), (3, 4), (5, 6, 7, 8) are considered to generate differentiated parity packets according to the priorities of data using the Reed-Solomon codes. Therefore, the priority groups are placed in priority groups P1, P2 and P3 according to their priorities, and then the parity packets are calculated.

More specifically, seven parity packets are added to two data packets (1, 2) in priority group P1 having the highest priority, and five parity packets are added to two data packets (3, 4) in priority group P2 having the second highest priority. Finally, four parity packets are added to four data packets (5, 6, 7, 8) in priority group P3 having the lowest priority.

In the case of priority group P1, since the number of added parity packets is seven, priority group P1 can be recovered even though up to seven packets among the total of nine packets are lost. Similarly, priority group P2 can be recovered even though up to five packets are lost, and priority group P3 can be recovered even though up to four packets are lost.

A bit rate adaptation granting process and a process of granting robustness against the loss according to another exemplary embodiment, in which a multi-view codec is used for encoding. The description will be made separately for one case where the transmitter selects data considering that the receiver plays only stereoscopic images, and another case where the transmitter selects data considering that the receiver plays both stereoscopic images and monoscopic images.

Figure 12:
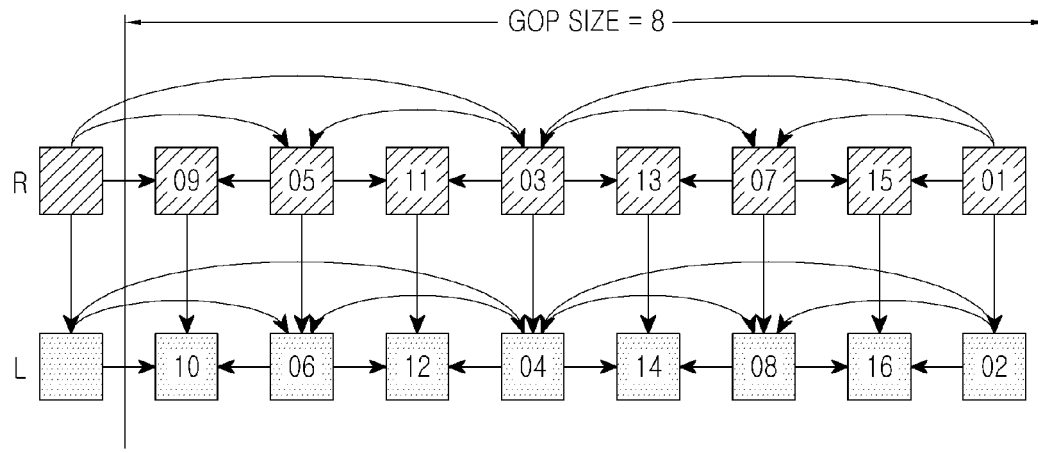
FIG. 12 is a diagram showing a reference relationship of a multi-view codec according to another exemplary embodiment.

FIG. 12 shows a reference relationship when an MVC is used for encoding stereoscopic images according to an exemplary embodiment. In FIG. 12, numbers in each frame indicate the encoded order of frames, R means the right images and L means the left images. The MVC (or multi-view codec) performs inter-view reference at the same time in addition to references on the time axis. In the case of the multi-view codec, since the inter-view reference relationships exist within the views in addition to the references on the time axis, the receiver may perform decoding using this reference relationship upon data loss.

Therefore, if the transmitter selects data considering that the receiver plays only stereoscopic images, the transmitter first selects high-priority frames since the left and right images are equal in priority in the stereoscopic images.

Figure 13:
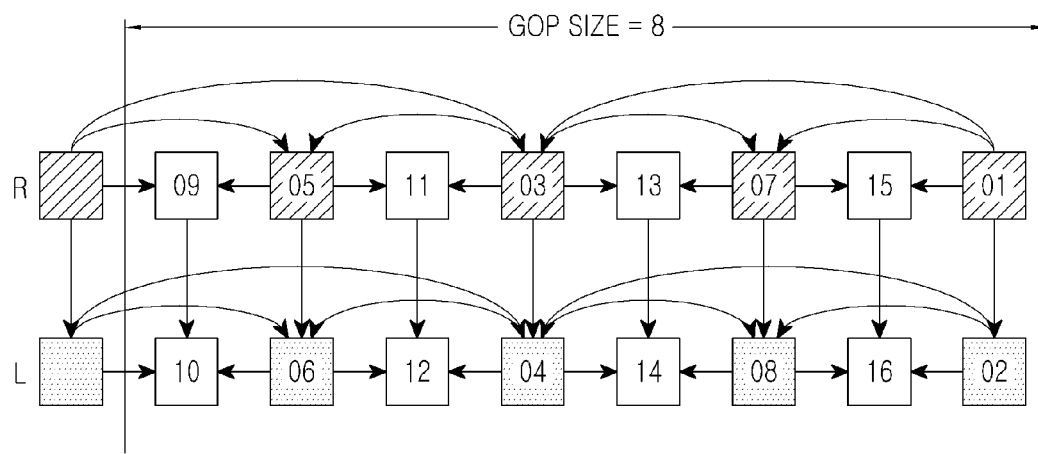
FIG. 13 is a diagram showing bit rate adaptation when only stereoscopic images are played according to an exemplary embodiment.

FIG. 13 shows an example of selecting transmission data by extracting frames #3 and #4 after extracting frames #1 and #2, and then extracting frames #5 and #6 in order. Thereafter, for data transmission, the left and right images existing in the same time points are merged in one packet and transmitted.

In contrast, if the transmitter selects data considering that the receiver plays stereoscopic images and monoscopic images, the transmitter selects the entire one view and then adds another view, instead of selecting all of the left and right images on the same time axis for the playback.

Figure 14:
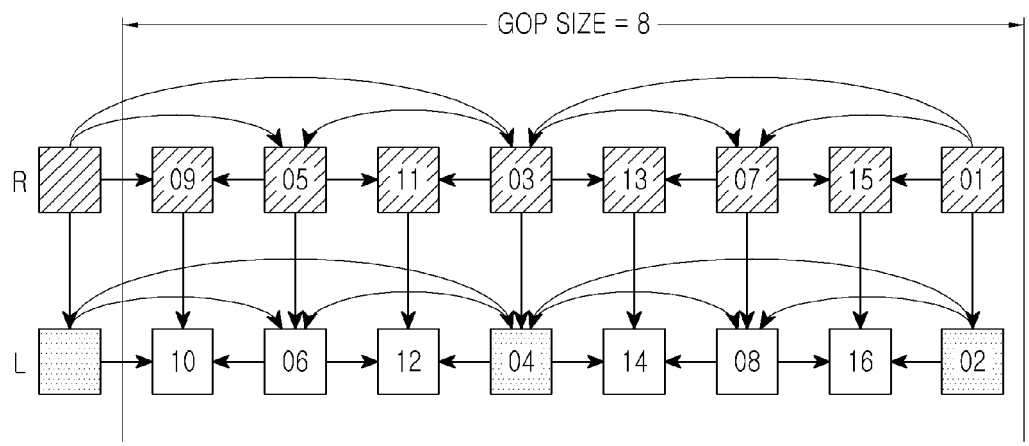
FIG. 14 is a diagram showing bit rate adaptation when stereoscopic images and monoscopic images are played according to an exemplary embodiment.

FIG. 14 shows an example of first selecting all of the left images and then additionally selecting the left images according to the bandwidth. That is, frames #1, #3, #5, #7, #9, #11, #13 and #15 corresponding to the right images are first selected, and frames #2 and #4 among the frames corresponding to the left images are additionally selected according to the bandwidth.

If the right images are not selected all because of the insufficiency of the bandwidth, the left images are selected according to the priorities in the right images. In FIG. 14, if frames of the left images are additionally selected, they may be added in order of (6, 8), (10, 12, 14, 16).

In this way, priority groups are determined according to the playback method and the number of referencing frames, and then parity packets are generated in different ways according to the determined priority groups to grant robustness against loss.

If the playback method is a method of playing only stereoscopic images, frames existing in the same points on the time axis are equal in priority because the left and right images have the same priorities. Accordingly, priority groups are determined by one or multiple frames in order of the large number of referencing frames along the time axis. The frames that have the same number of referencing frames and correspond to the left and right images located in the same time points are determined as the same priority groups.

For example, the frame #3 having the largest number 13 of referencing frames, the frame #1 referenced by the frame #3, and the frames #2 and #4 existing in the same points on the time axis as the frames #1 and #3 are selected together, forming a priority group of (1, 2, 3, 4).

The frames #5 and #7 having the second largest number of referencing frames and the frames #6 and #8 making pairs with the frames #5 and #7, respectively, in the same time points are collected to form a priority group of (5, 6, 7, 8).

Finally, the frames #9, #11, #13 and #15 having the same number of referencing frames and frames #10, #12, #14 and #16 forming pairs with them respectively are gathered to form a priority group of (9, 10, 11, 12, 13, 14, 15, 16).

The priority groups of (1, 2, 3, 4), (5, 6, 7, 8), (9, 10, 11, 12, 13, 14, 15, 16) made by the above-described method are determined as priority groups P1, P2 and P3, respectively, according to the granted priorities.

In contrast, if the playback method is a method of playing stereoscopic images and monoscopic images, inter-view reference relationships exist in addition to the references on the time axis. Therefore, the number of referencing frames among frames is determined based on the references on the time axis and the inter-view reference relationships, and then priority groups are determined according to the number of referencing frames.

For example, the priorities are determined in order of (1, 2, 3, 4), (5, 7), (9, 11, 13, 15), and (10, 12, 14, 16) according to the number of directly referencing frames. Similarly, frames referencing the frame #1 and the frame #2 exist even on the right side of the frame #1 and the frame #2. Therefore, the frame #1 and the frame #2 may be granted higher priorities compared with the frame #3 and the frame #4. Meanwhile, the frames #10, #12, #14 and #16 do not affect other frames except for themselves, even though they are lost.

A description will now be made of a bit rate adaptation granting process and a process of granting robustness against the loss in another exemplary embodiment, in which two single-view codecs are used for encoding.

Figure 15:
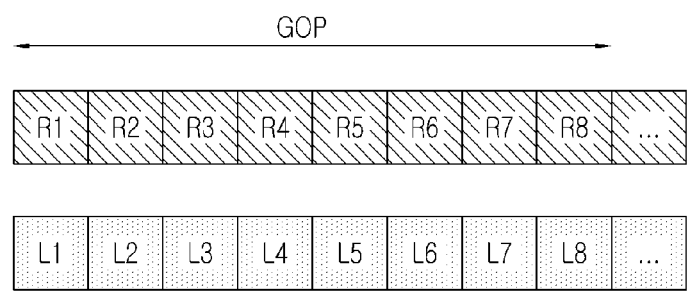
FIG. 15 is a diagram showing bitstreams when two single-view codecs are used, according to another exemplary embodiment.

FIG. 15 shows encoded bitstreams when two single-view codecs are used. As shown in FIG. 15, two left and right images exist every time, there is no inter-view reference relationship, and only reference relationships on the time axis exist within the views.

Therefore, if the transmitter selects data considering that the receiver plays only stereoscopic images, it has different reference relationships according to the encoding structure, such as when one image is created using two-view images and one single-view codec is used.

In summary, priority groups are made by grouping frames according to the priorities for each view and unifying groups of each view having the same priorities. In other words, one or multiple frames having the same number of referencing frames are grouped in order of the large number of referencing frames for each view, and then, priority groups are determined by grouping one view group and another view group on the same time axis.

Figure 16:
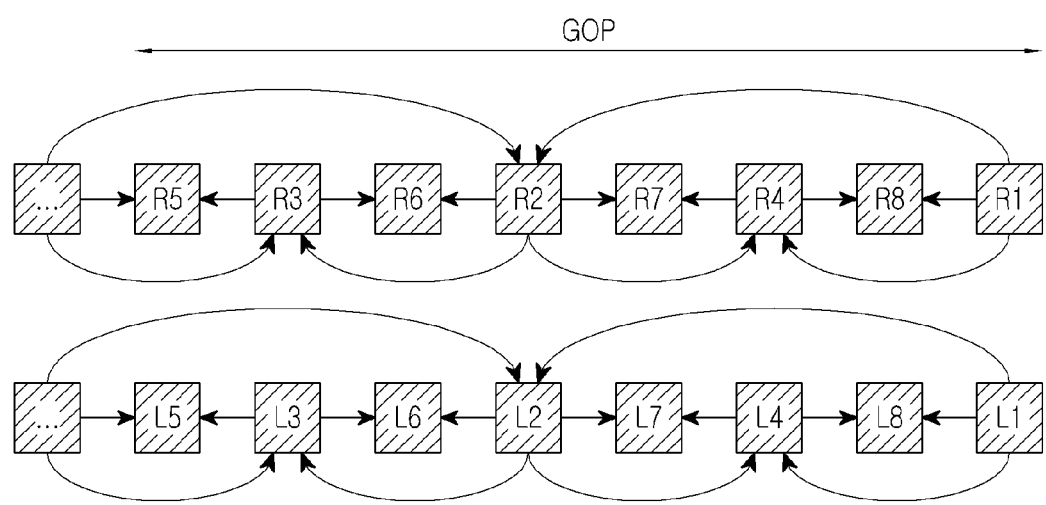
FIG. 16 is a diagram showing a reference relationship when two single-view codecs are used, according to an exemplary embodiment.

For example, in the encoding structure shown in FIG. 16, groups of (R1, R2), (R3, R4), (R5, R6, R7, R8) are formed in the right-image view, and groups of (L1, L2), (L3, L4), (L5, L6, L7, L8) are formed in the left-image view.

Groups of each view are grouped again, forming priority groups of (R1, L1, R2, L2), (R3, L3, R4, L4), (R5, L5, R6, L6, R7, L7, R8, L8).

If the receiver plays only stereoscopic images, the left and right images need to be played at the same quality. Thus, the encoding structures for the two views need to be the same. Therefore, once priorities for one view are determined, the same priorities are applied to the other view.

In contrast, if the transmitter selects data considering that the receiver plays stereoscopic images and monoscopic images, the transmitter selects the view to be played in a monoscopic manner, and adds important data according to the bandwidth.

If the bandwidth is sufficient for playback in a monoscopic manner, the transmitter adds high-priority data of the other view to the remaining bandwidth. By doing so, the receiver may play the additionally selected data in a stereoscopic manner.

When the bitstreams are encoded in the structure of B, B, B, B, B, B, B, I frames as shown in FIG. 15, positions and reference relationships of the actual bitstreams are as shown in FIG. 16.

It is noted in FIG. 16 that reference relationships on the time axis in the multi-view codec are identical to reference relationships on the time axis in the two single-view codecs, except for the existence of inter-view reference relationships in the multi-view codec.

Therefore, when the transmitter selects data considering that the receiver plays only stereoscopic images, frames existing in the same points on the time axis are equal in priority because priorities of the left and right images are the same. For example, in the encoding structure shown in FIG. 16, groups of (R1, L1, R2, L2), (R3, L3, R4, L4), (R5, L5, R6, L6, R7, L7, R8, L8) are determined as priority groups P1, P2 and P3, respectively.

In contrast, when the transmitter selects data considering that the receiver plays stereoscopic images and monoscopic images, its operation is similar to that in the multi-view codec since two single-view codecs are used. However, because of the absence of the inter-view reference relationship, the frames may be grouped in priority group P1 with the largest number of referencing frames, priority group P2 with the second largest number of referencing frames, and P3 with no referencing frames.

However, because stereoscopic playback is performed after monoscopic playback is fully satisfied, the view selected for the monoscopic playback unconditionally prevails in priority over the other view.

For example, in FIG. 16, (R1, R2, L1, L2) with the largest number of referencing frames, (R3, R4, L3, L4) with the second largest number of referencing frames, and (R5, R6, R7, R8, L5, L6, L7, L8) with no referencing frames may be grouped in P1, P2 and P3, respectively.

However, if the monoscopic playback screen has been determined based on the right images, (L1, L2) is lower in priority than (R3, R4). That is, priority groups (R1, R2), (R3, R4), (R5, R6, R7, R8) of the right images selected for monoscopic playback are followed by priority groups (L1, L2), (L3, L4), (L5, L6, L7, L8) of the other view.

In this manner, priority groups are determined by selecting frames of the view to be played in a monoscopic manner and then adding frames having a large number of referencing frames in the other view according to the bandwidth.

The number of lost frames will be measured when the different codecs are used, in order to find out the actual improvement of the service quality according to the embodiments of the present invention.

Figure 17:
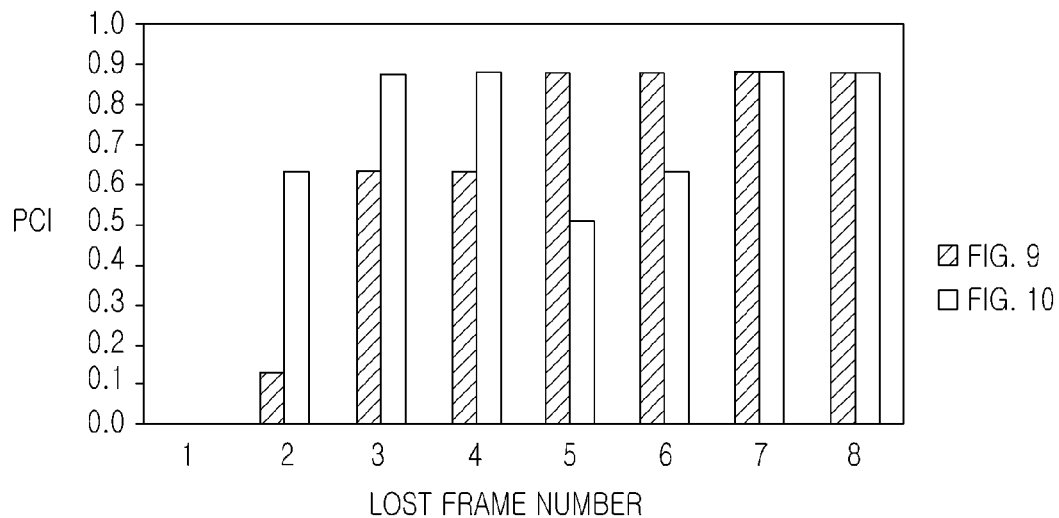
FIG. 17 is a diagram showing PCI coefficients when frames in FIGS. 9 and 10 are lost.

FIG. 17 shows Play Continuity Index (PCI) coefficients when each frame is lost in the case where a GOP consists of 8 frames and the frames have reference relationships shown in FIGS. 9 and 10.

In FIG. 17, if the frame #1 is lost, the PCI appears as '0', as in the results of both cases. In this case, since the frame #1 does not exist even if all of the rest data exists, decoding of the entire GOP is not possible, making it impossible to play the entire one GOP.

In the reference structure shown in FIG. 9, the frame #2 references the frame #1 and the frames #3 and #4 reference the frame #2. So, if the frame #2 is lost, up to the frame #1 can be decoded and played, but the other frames, i.e., the frames #3 and #4, cannot be decoded, disabling the playback.

In the case of the frames #5, #6, #7 and #8, even though some of them are lost, it is not possible to decode only the lost frames among them because there is no frame referencing them.

In FIG. 10, if the frame #2 is lost, it is not possible to decode the frame #2, and the frames #3 and #4 referencing the frame #2.

Similarly, if some of the frames #3, #4, #7 and #8 are lost, it is not possible to decode only the lost frames among them because there is no frame referencing them. That is, it could be understood from the two results that the high-priority frames referenced more frequently may have more significant influences upon their loss. Hence, the present invention provides the proposed method in which as parities are added in the event of loss, the high-priority frames may be well recovered during recovery of the loss.

Figure 18:
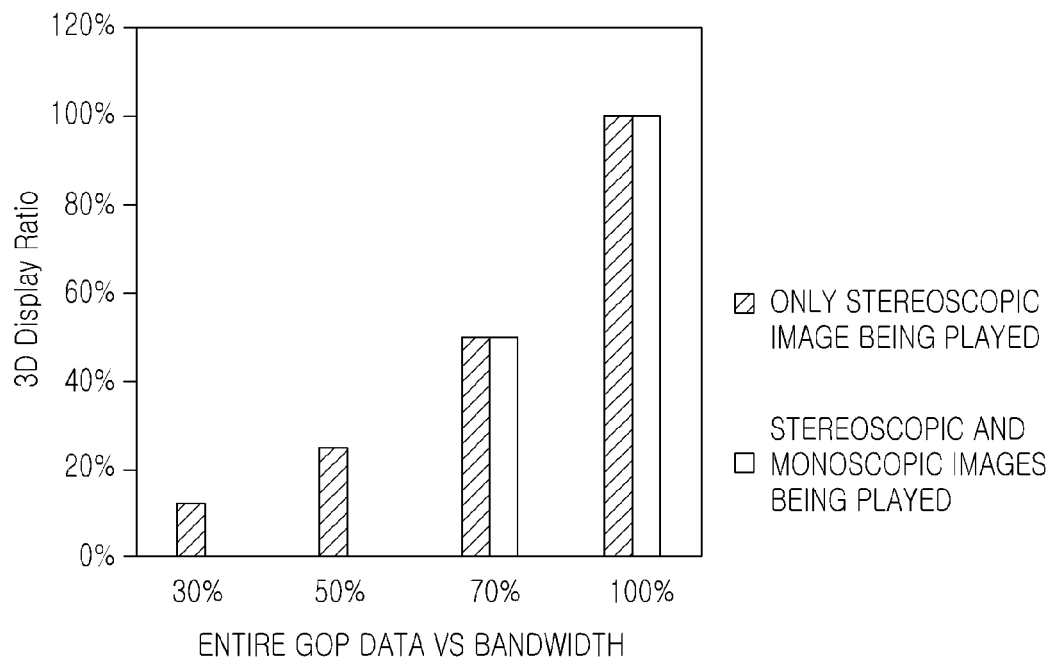
FIG. 18 is a diagram showing 3D display ratios versus a bandwidth when a multi-view codec is used.

FIG. 18 shows three-dimensional (3D) display ratios versus a bandwidth occupied by the entire GOP for bitstreams encoded using a multi-view codec according to the change in the playback method due to a change in the bandwidth.

In the case where one GOP consists of eight frames, if all of the eight frames are played in stereoscopic images, the 3D display ratio is 100%, and if only four frames are played in a stereoscopic manner, the 3D display ratio is 50%. In the case where only stereoscopic images are played, even when only some images are played due to the low bandwidth, they are always played in the stereoscopic images, reducing the 3D display ratio.

However, a 3D display ratio of 12.5% in a bandwidth of about 30% indicates a broken screen on which only one of the eight frames in the GOP is played and the others are not played.

On the contrary, in the case where stereoscopic images and monoscopic images are both played, if the bandwidth is low, even the monoscopic images are played seamlessly, and if the bandwidth is high, the images are played seamlessly at the same 3D display ratio.

Figure 19:
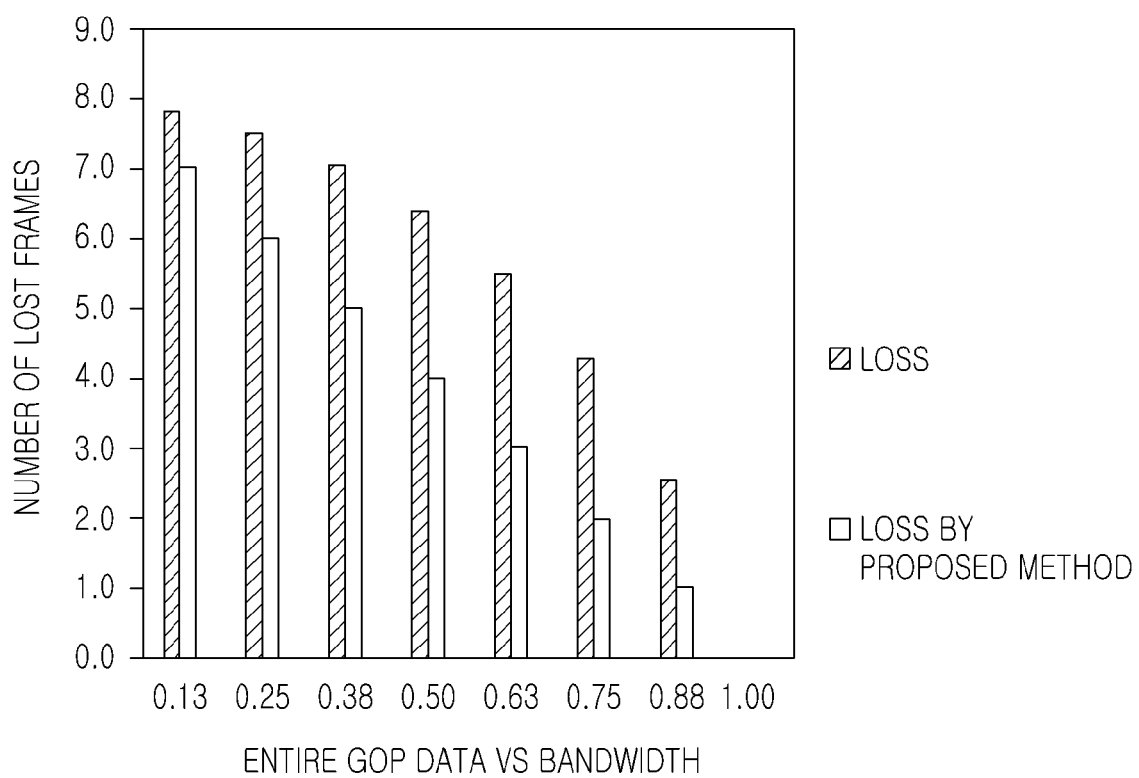
FIG. 19 is a diagram showing the number of lost frames versus a bandwidth when one single-view codec is used.

FIG. 19 shows the number of lost frames versus a bandwidth on the assumption that data size of each frame is the same in the reference relationship structure of FIG. 9.

In the bandwidth where only one frame in the GOP consisting of 8 frames can be transmitted, the remaining seven frames may be lost. Therefore, a loss probability of each frame may be 7/8. Because the number of frames affected by the loss is different according to the loss of each frame, the average may be calculated.

Figure 20:
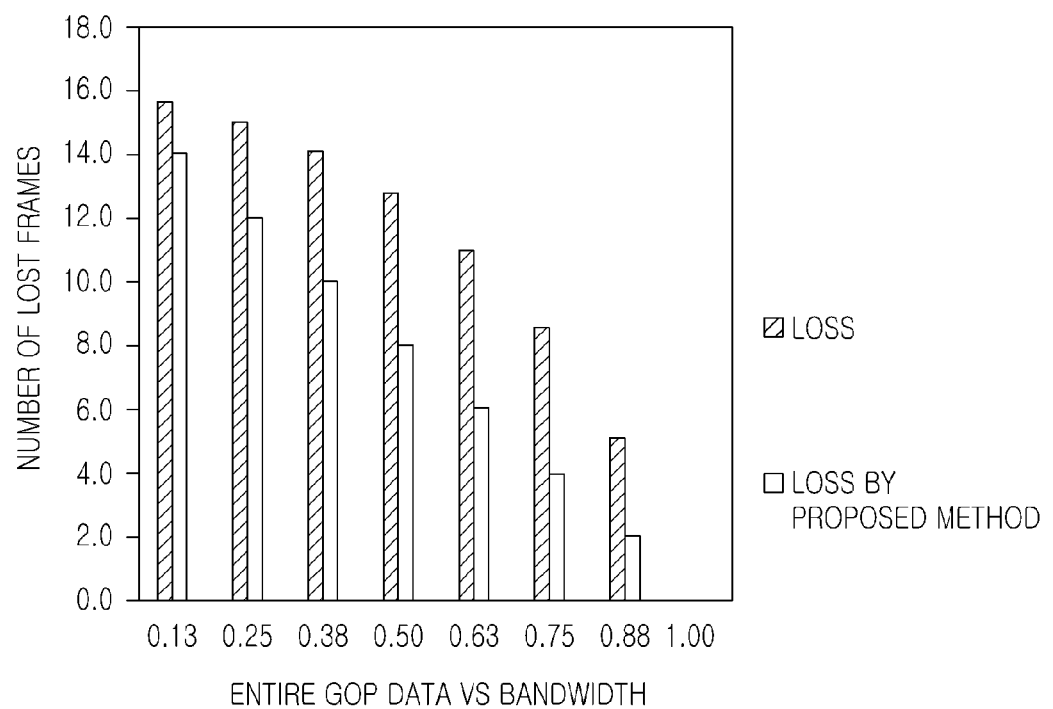
FIG. 20 is a diagram showing the number of lost frames versus a bandwidth when two single-view codecs are used.

FIG. 20 shows the number of lost frames versus a bandwidth when two single-view codes are used. If it is assumed that one GOP of each view consists of 8 frames, a total of 16 frames exist and each view may suffer the loss independently.

Figure 21:
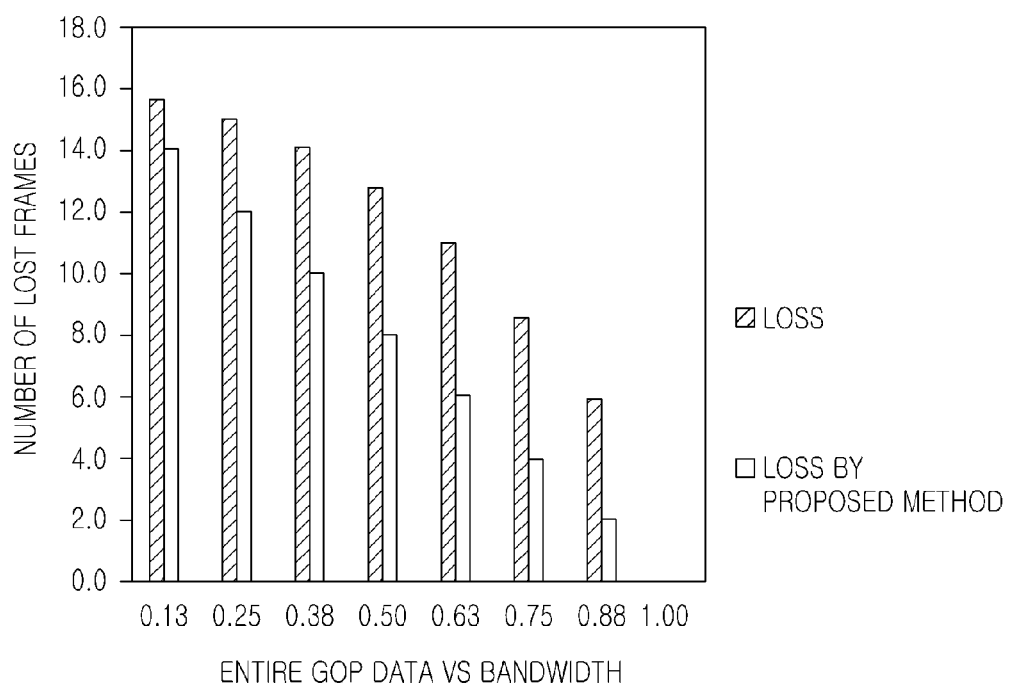
FIG. 21 is a diagram showing the number of lost frames versus a bandwidth when monoscopic images and stereoscopic images are simultaneously played by a multi-view codec.
Figure 22:
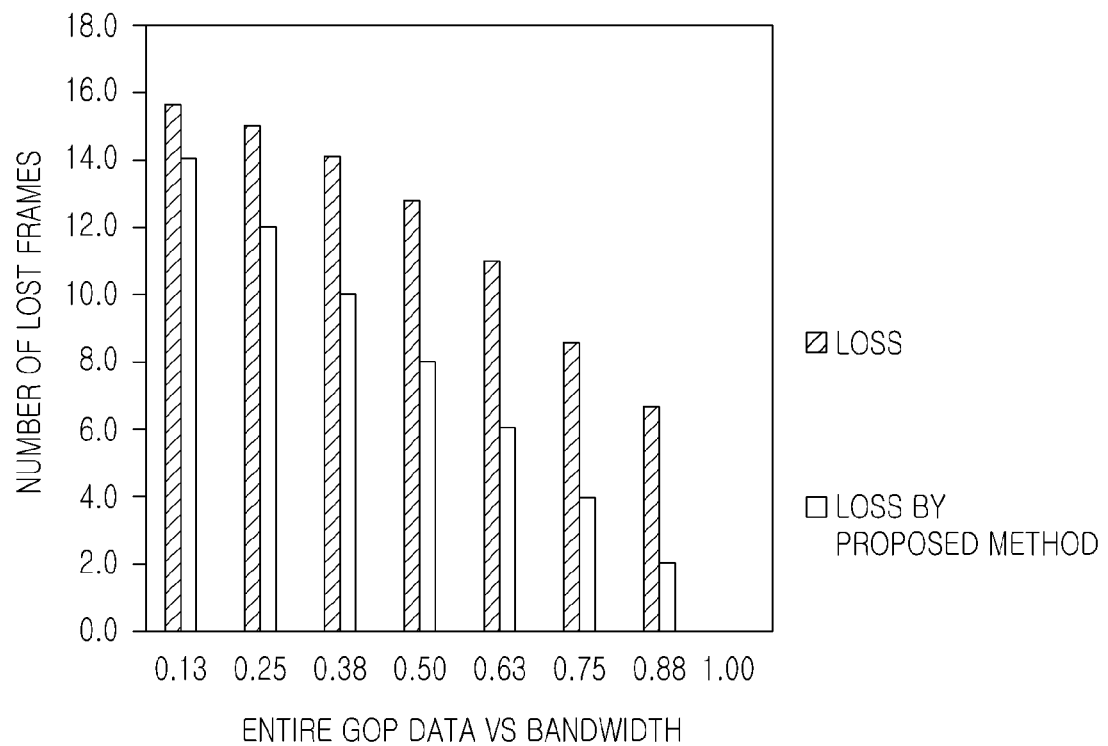
FIG. 22 is a diagram showing the number of lost frames versus a bandwidth when only stereoscopic images are played by a multi-view codec.

FIG. 21 shows the number of lost frames versus a bandwidth when monoscopic images and stereoscopic images are simultaneously played, and FIG. 22 shows the number of lost frames versus a bandwidth when only stereoscopic images are played. Since the multi-view codec provides inter-view reference relationships and the order of selecting frames to be transmitted is different according to the playback method, the number of lost frames varies according to the bandwidth.

As is apparent from the foregoing description, the exemplary embodiments can cope with loss during transmission by determining priorities of transmission data according to the playback method taking the channel condition into account, generating different numbers of parity packets according to the determined priorities, and then transmitting the parity packets. By doing so, it is possible to improve the service quality.

While exemplary embodiments have been shown and described, it will be understood by those skilled in the art that various changes in form and details may be made therein without departing from the spirit and scope of the invention as defined by the appended claims and their equivalents.

What is claimed is:

1. A method for transmitting bit stream of image data, the method comprising:
    granting a priority to each of a plurality of frames constituting one image group based on inter-time reference relationships or both the inter-time reference relationships and inter-view reference relationships between frames in the bit stream comprising at least one image group;
    determining a number of transmittable frames based on a variable channel environment; and
    selecting frames from among the plurality of frames that constitute the one image group based on the determined number of transmittable frames and the granted priorities according to whether a receiver plays only a stereoscopic image or both the stereoscopic image and a monoscopic image and according to whether a type of codec for encoding is one single-view codec, a multi-view codec, or two single-view codecs.

2. The method of claim 1, wherein the selecting comprises selecting the transmittable frames in order of highest priority to lowest priority.

3. The method of claim 1, wherein the granting the priority comprises:
    determining a number of frames referencing each of the plurality of frames for encoding of other frames, based on a reference relationship between the plurality of frames constituting one image group; and
    granting the priority to each of the plurality of frames based on the determined number of referencing frames so that a higher priority is granted to a frame having a larger number of referencing frames.

4. The method of claim 3, wherein a priority group including one or multiple frames is determined for each of the numbers of referencing frames, and the transmittable frames are selected based on the priority group.

5. The method of claim 4, further comprising setting a ratio of parity packets to be added for each of the priority groups, and adding parity packets to one or multiple frames included in a selected priority group according to the set ratio of parity packets for the selected priority group, wherein the set ratio of parity packets is different for each of the priority groups.

6. The method of claim 5, wherein the ratio of parity packets to be added is set for each of the priority groups such that a ratio of parity packets to be added to an arbitrary priority group is lower than a ratio of parity packets to be added to a priority group having a priority higher than that of the arbitrary priority group.

7. The method of claim 6, wherein the encoding is performed by one single-view codec.

8. The method of claim 1, wherein when a left image and a right image are encoded using a multi-view codec to enable playback of only a stereoscopic image, the priorities are granted based on a reference relationship on a time axis between a plurality of frames constituting one left image group for the left image, a reference relationship on the time axis between a plurality of frames constituting one right image group for the right image, and a reference relationship between frames in the left image group and frames in the right image group.

9. The method of claim 8, further comprising setting a number of parity packets to be added for each of the priority groups, and adding the set number of parity packets to the selected transmittable frames, for a priority group including the selected transmittable frames, wherein the set number of parity packets to be added is different for each of the priority groups.

10. The method of claim 8, wherein the granting the priority comprises:
    determining a number of frames referencing each of the plurality of frames constituting the one left or right image group for encoding other frames, based on a reference relationship on the time axis between the plurality of frames constituting each of the left and right image groups and a reference relationship at a same time between frames in the left image group and frames in the right image group;
    granting a priority to each of the plurality of frames constituting the one left or right image group depending on the determined number of referencing frames so that a higher priority is granted to a frame having a larger number of referencing frames; and
    granting the same priority as the priority granted to each of the plurality of frames constituting the one left or right image group, to frames existing at the same time in the one left or right image group.

11. The method of claim 1, wherein when a left image and a right image are encoded using a multi-view codec to enable playback of a stereoscopic image and a monoscopic image, a priority is first granted to one of the left image and the right image.

12. The method of claim 11, further comprising setting a number of parity packets to be added for each of the priority groups, and adding the set number of parity packets to the selected transmittable frames, for the priority group including the selected transmittable frames, wherein the set number of parity packets to be added is different for each of the priority groups.

13. The method of claim 11, wherein if a bandwidth is sufficient for playback in the monoscopic image, adds high-priority data of the other view to a remaining bandwidth.

14. The method of claim 3, wherein when a left image and a right image are encoded using different single-view codecs to enable playback of only a stereoscopic image, the one image group is created for the left image and the right image.

15. The method of claim 14, wherein when a left image and a right image are encoded using different single-view codecs to enable playback of a stereoscopic image and a monoscopic image, a higher priority is granted to one of the left image and the right image compared with the other image, for playback of the monoscopic image.

16. An apparatus for transmitting bit stream of image data, the apparatus comprising:
a channel monitor which monitors a channel environment; and
an extractor which grants a priority to each of a plurality of frames constituting one image group based on inter-time reference relationships or both the inter-time reference relationships and inter-view reference relationships between frames in the bit stream comprising at least one image group, determines a number of transmittable frames based on the channel environment monitored by the channel monitor, and selects frames from among the plurality of frames that constitute the one image group based on the determined number of transmittable frames and the granted priorities according to whether a receiver plays only a stereoscopic image or both the stereoscopic image and a monoscopic image and according to whether a type of codec for encoding is one single-view codec, a multi-view codec, or two single-view codecs.

17. The apparatus of claim 16, wherein the extractor selects frames in order of highest priority to lowest priority.

18. The apparatus of claim 16, wherein the extractor determines the number of frames referencing each of the plurality of frames for encoding of other frames, based on a reference relationship between the plurality of frames constituting the one image group, and grants a priority to each of the plurality of frames based on the determined number of referencing frames so that a higher priority is granted to a frame having a greater number of referencing frames.

19. The apparatus of claim 18, wherein the extractor determines a priority group among a plurality of priority groups including one or multiple frames for each of the numbers of referencing frames, and selects the transmittable frames based on the priority group.

20. The apparatus of claim 19, further comprising a transmission unit which sets a ratio of parity packets to be added for each of the priority groups, and adds parity packets to one or multiple frames included in a selected priority group according to the set ratio of parity packets for the selected priority group, wherein the set ratio of parity packets is different for each of the priority groups.

21. The apparatus of claim 20, further comprising a parity generator which generates parity packets such that a ratio of parity packets to be added to an arbitrary priority group is lower than a ratio of parity packets to be added to a priority group having a priority higher than that of the arbitrary priority group, when a ratio of parity packets to be added is set for each of the priority groups and the ratio of parity packets to be added is different for each of the priority groups.

22. The apparatus of claim 21, wherein one single-view codec performs the encoding.

23. The apparatus of claim 16, wherein when a left image and a right image are encoded using a multi-view codec to enable playback of only a stereoscopic image, the extractor grants the priorities based on a reference relationship on a time axis between a plurality of frames constituting one left image group for the left image, a reference relationship on the time axis between a plurality of frames constituting one right image group for the right image, and a reference relationship between frames in the left image group and frames in the right image group.

24. The apparatus of claim 23, further comprising a transmission unit which sets a ratio of parity packets to be added for each of the priority groups, and adds parity packets to the selected transmittable frames of a selected priority group according to the set ratio of parity packets for the selected priority group, wherein the set ratio of parity packets is different for each of the priority groups.

25. The apparatus of claim 23, wherein the extractor:
determines a number of frames referencing each of the plurality of frames constituting the one left or right image group for encoding of other frames, based on a reference relationship on the time axis between the plurality of frames constituting each of the left and right image groups and a reference relationship at a same time between frames in the left image group and frames in the right image group;
grants a priority to each of the plurality of frames constituting the one left or right image group based on the determined number of referencing frames so that a higher priority is granted to a frame having a larger number of referencing frames; and
grants a same priority as the priority granted to each of the plurality of frames constituting the one left or right image group, to frames existing at the same time in the one left or right image group.

26. The apparatus of claim 16, wherein when a left image and a right image are encoded using a multi-view codec to enable playback of a stereoscopic image and a monoscopic image, the extractor first grants a priority to one of the left image and the right image.

27. The apparatus of claim 26, wherein if a bandwidth is sufficient for playback in the monoscopic image, adds high-priority data of the other view to a remaining bandwidth.

28. The apparatus of claim 18, wherein when a left image and a right image are encoded using different single-view codecs to enable playback of only a stereoscopic image, the one image group is created for the left image and the right image.

29. The apparatus of claim 28, further comprising a transmission unit which sets a number of parity packets to be added for each of the priority groups, and adds the set number parity packets to the selected transmittable frames, for the priority group including the selected transmittable frames, wherein the set number of parity packets to be added is different for each of the priority groups.

30. The apparatus of claim 28, wherein when a left image and a right image are encoded using different single-view codecs to enable playback of a stereoscopic image and a monoscopic image, the extractor grants a higher priority to one of the left image and the right image compared with the other image, for playback of the monoscopic image.

* * * * *